(12) United States Patent
Bonforte et al.

(10) Patent No.: US 8,219,916 B2
(45) Date of Patent: Jul. 10, 2012

(54) TECHNIQUES FOR VISUAL REPRESENTATION OF USER ACTIVITY ASSOCIATED WITH AN INFORMATION RESOURCE

(75) Inventors: Jeff Bonforte, San Francisco, CA (US); Marc Davis, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1019 days.

(21) Appl. No.: 12/180,146

(22) Filed: Jul. 25, 2008

(65) Prior Publication Data

US 2010/0023868 A1 Jan. 28, 2010

(51) Int. Cl.
*G06F 3/00* (2006.01)
*G06F 3/048* (2006.01)

(52) U.S. Cl. ......... 715/733; 715/738; 715/751; 715/772

(58) Field of Classification Search ................. 715/704, 715/733–747, 751, 853–854, 705–708, 234, 715/240–241, 759, 772; 709/203, 224
See application file for complete search history.

(56) References Cited

U.S. PATENT DOCUMENTS

| | | | | |
|---|---|---|---|---|
| 5,008,853 | A * | 4/1991 | Bly et al. ..................... | 715/751 |
| 7,249,123 | B2 * | 7/2007 | Elder et al. ..................... | 1/1 |
| 7,457,873 | B2 * | 11/2008 | Mariani et al. ................. | 709/224 |
| 7,752,552 | B2 * | 7/2010 | Pennington et al. ........... | 715/751 |
| 7,801,950 | B2 * | 9/2010 | Eisenstadt et al. ............ | 709/203 |
| 7,945,861 | B1 * | 5/2011 | Karam ........................... | 715/751 |
| 2002/0070953 | A1 * | 6/2002 | Barg et al. ..................... | 345/700 |
| 2007/0061412 | A1 * | 3/2007 | Karidi et al. .................. | 709/217 |
| 2007/0282950 | A1 * | 12/2007 | Fischer et al. ................ | 709/204 |
| 2007/0282980 | A1 * | 12/2007 | Fischer et al. ................ | 709/219 |
| 2008/0183664 | A1 * | 7/2008 | Cancel et al. .................... | 707/2 |

OTHER PUBLICATIONS

Xiong et al., "LiveWeb: Visualizing Live User Activities on Web", Proceeding SIGGRAPH '99 ACM SIGGRAPH 99 Conference abstracts and applications, copyright ACM 1999, p. 254.*

* cited by examiner

*Primary Examiner* — William Bashore
*Assistant Examiner* — Andrew Tank
(74) *Attorney, Agent, or Firm* — Hickman Palermo Truong Becker Bingham Wong LLP (57) ABSTRACT

A system and methodology for visually representing user activity associated with an information resource is described. Online and offline activities of users are associated with symbolic representations of those users. In an embodiment, the symbolic representation of a user has the appearance of a dust particle. The dust particle can provide a universal and unobtrusive visual representation of the online or offline activity of the represented user. Further, the dust particle can exist for the represented user to communicate with other users with privacy and anonymity. To visually convey selected aspects of an online or offline activity, the activity is mapped to visual attributes that alter the dust particle behavior and/or appearance. The result is a dynamic and universal representation of online and offline user activities associated with an information resource such as a web page, database, or document that can help other online users efficiently discern the relevancy and popularity of the information resource.

54 Claims, 4 Drawing Sheets

TECHNIQUES FOR VISUAL REPRESENTATION OF USER ACTIVITY ASSOCIATED WITH AN INFORMATION RESOURCE

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to display of an information resource, and in particular, to generating visual representations of user activity associated with an information resource.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The expansion of the Internet and the World Wide Web ("web") has resulted in the rapid proliferation of web sites and web pages accessible to users. It is estimated that as of December 2007 close to 70 million active web sites existed on the Internet. (December 2007 Web Survey, http://news.netcraft.com/archives/2007/12/index.html). Not surprisingly, then, users can find a web site on almost any conceivable topic of interest.

While the diversity of information available on the Internet has exploded, techniques for helping users visually discern the relevancy and popularity of web pages have not kept pace. Specifically, users have difficultly telling, from viewing a web page, how popular that web page is or what user activity associated with the web page has taken place. Often, a web page viewed by the hundredth visitor appears the same as the web page did to the first visitor. The hundredth visitor has little idea, from viewing the web page, who the previous visitors were and how those previous visitors interacted with the web page. Information about how previous visitors interacted with the web page is valuable to current visitors, as such information provides an indication of the popularity and relevancy of the content on the web page.

Interacting with a web page is one example of the many possible user activities that may be conducted by users. In general, user activities may be offline or online. Typically, an online user activity involves a user requesting an online resource or a service from one or more online services capable of providing the requested resource or service. Resources may include documents, images, video, and the like. Services may be as varied as providing web pages, e-mail services, instant messaging services, etc.

An offline user activity includes any physical user activity conducted by a user and that may be represented by data that describes the physical activity. Such data may be collected, for example, by electronic physical sensors that collect information about the physical activity as it occurs. For example, consider the scenario of a user jogging along her favorite jogging path. If the jogger carries a global positioning satellite (GPS) device with her as she jogs then the device can collect global positioning information that describes the location and path of her jog. This information may be reported by the GPS device to an online service by using, for example, a wireless communications network or a physical cable that connects the device to a networked device that communicates the information over a data network to the online service.

Alternatively, a user may provide information that describes an offline physical activity directly to an online service. Continuing the jogging example, the jogger may provide information that describes her jog to an online service after she has completed the jog. In both cases, whether information that describes an offline physical activity is collected by electronic sensors or directly from a user, the information describes the offline physical activity itself and not the online activity of reporting the information to an online service.

Some information resources such as web pages provide limited visual representations of user activity. For example, a hit counter may be displayed on a web page to visually represent the number of times that the web page has been viewed by visitors to the web page. However, hit counters are limited in their ability to visually represent user activity. A hit counter does not visually convey some significant information that would help the current visitor discern the relevancy and popularity of the web page such as, for example, the identity of the previous visitors to the web page.

A tag cloud is a more recent example of a limited technique for visual representation of user activity. A tag is user-created keyword or category label that is associated with a web resource such as a document or an image. Tag clouds provide an aggregate display of tag-usage statistics. Specifically, tag clouds provide a visual cue of the most popular tags and the relative popularity of those tags. For example, a user who uploads photos from a recent birthday party to a photo sharing website may tag the photos with the keyword "birthday." Another user uploading photos from a recent trip to San Francisco may tag the photos with the category label "San Francisco." The photo-sharing web site may display the tags associated with uploaded photos in a tag cloud. In such a tag cloud, each tag has a corresponding weight. For each tag in a tag cloud, a visual cue is provided to give an indication of the popularity of the tag. For example, if there are more photos tagged with "birthday" than with "San Francisco," then the "birthday" tag might be displayed in a larger font size relative to the "San Francisco" tag.

However, tag clouds are limited in their ability to represent user activities other than tagging web resources. Further, visual representations of tags are limited to manipulations of the tag text, such as changing font size.

In addition to web pages, there are numerous other digital information resources such as databases and electronic documents for which there is a need to be able to efficiently visually discern the user activity associated with the information resource. Current techniques for determining user activity associated with an information resource require inspection of information resource itself and perhaps other information resources containing metadata that describe user activity associated with the information resource of interest. Further, there is no known universal technique for visually representing user activity associated with an information resource that can be applied to both web pages and other types of information resources such as databases and documents.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are disclosed for generating and displaying a visual representation of user activities associated with an information resource through "Dust." According to an embodiment, a collection of dust particles (which may be represented via a collection of pixels) is displayed in conjunction with the display of the information resource, for example a web page or a document, to provide a visual representation of user activities associated with the information resource. Each dust particle symbolically represents a user or groups of users that conducted an online or offline activity associated with the information resource. To provide a visual representation of the online or offline activity, the activity is mapped to a set of visual attributes. When displayed in conjunction with the display of the information resource, each dust particle exhibits the visual attributes that are mapped to the activity. In this manner, each dust particle provides a visual representation of a user's online or offline activity associated with the information resource. A variety of types of dust particles and various visual attributes and behaviors thereof are described in greater detail hereinafter.

In an embodiment, selected dimensions of an online or offline activity are represented by applying additional visual attributes to dust particles. To provide a visual representation of a selected dimension, the dimension of the activity is mapped to a set of visual attributes. When displayed in conjunction with the display of an information resource, each dust particle exhibits the additional visual attributes that are mapped to the selected dimension of the activity. In this manner, each dust particle can provide a visual representation of multiple dimensions of an online or offline activity. Techniques for representing multiple dimensions of a user activity by applying visual attributes to dust particles are described in greater detail hereinafter.

By using techniques described herein, more dimensions of a user's online or offline activity may be conveyed through a symbolic representation of the user, including, but not limited to: temporal, periodic, spatial, geographical, social, and topical dimensions of the user activity. Further, in order to convey selected dimensions, the symbolic representation may exhibit more visual attributes, including but not limited to: color, shape, size, translucency, animation, iconicity, brightness, contrast, distance among symbolic representations, the position of symbolic representations relative to the display of the web page, changing appearance based on context, sparkling to draw attention, aging or fading to give indication of relevance and/or popularity, clumping into logical groups, and making use of information from external services.

Figure 1:
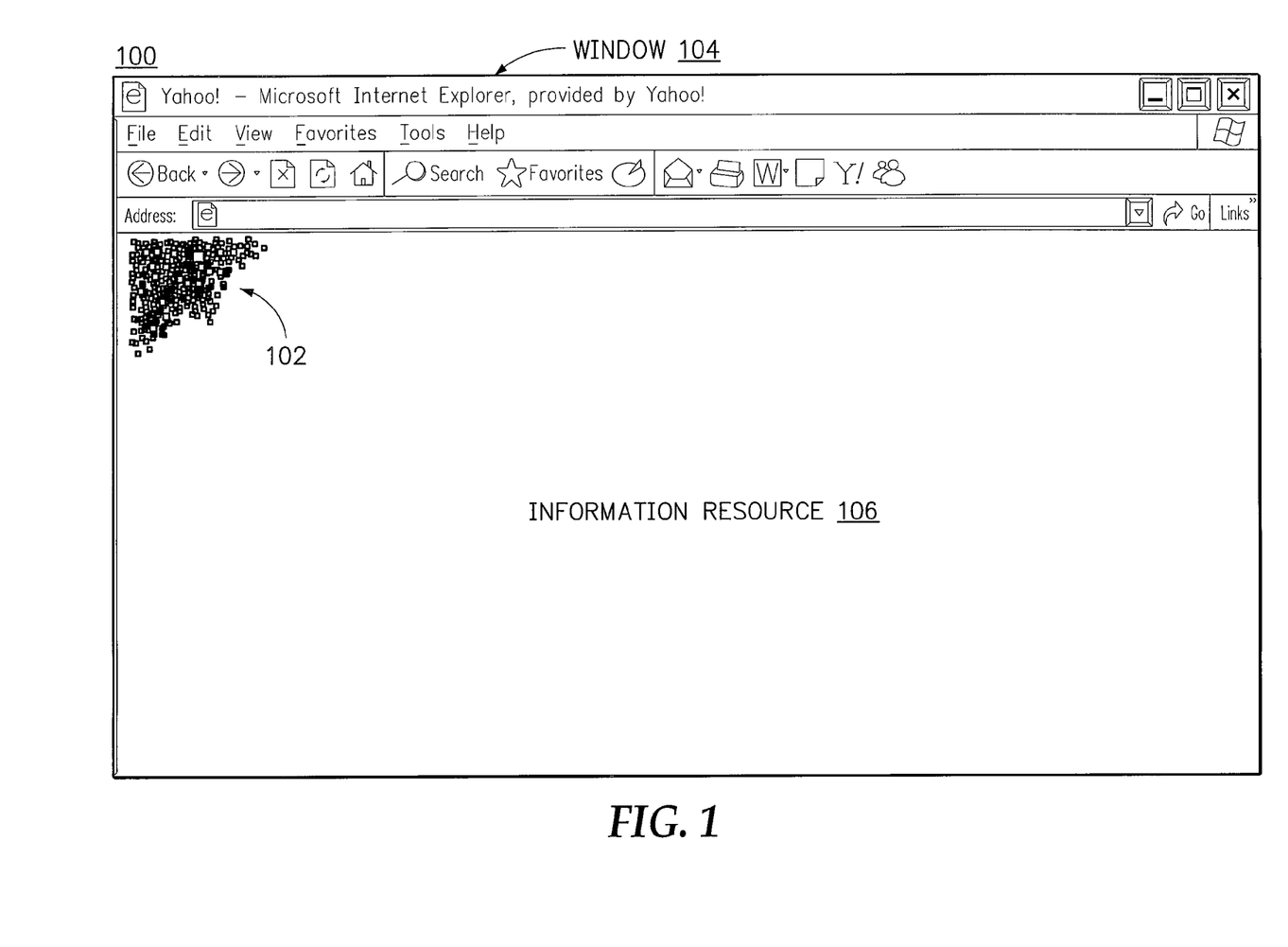
FIG. 1 is a screen shot from the display of a client device of an embodiment of the invention.

FIG. 1 includes screen shot 100 that shows Dust, according to an embodiment of the invention. Screen shot 100 is from the display of a client device. The screen is generated by a client application that employs the techniques described hereinafter, according to an embodiment of the invention. Screen shot 100 shows a collection of dust particles 102 that are displayed in conjunction with the display of information resource 106 in window 104. For ease of explanation, information resource 106 is shown as a web page. The web page may be any web page containing content such as text, pictures, multimedia, and the like, served from virtually any web server. Embodiments of the invention, however, are not limited to display of dust particles in conjunction with the display of a web page. Dust particles 102 may be displayed in conjunction with the display of virtually any information resource that may be displayed on the display of a client device such as a document or an image and the like.

As used herein, "information resource" refers to any identifiable data or collection of data that may be associated with user activity information by its identifier. "User activity information" is explained in greater detail hereinafter but in general refers to collected data or information that describes characteristics or features of a user activity associated with an information resource. Non-limiting examples of information resources include web pages, database data, online gaming statistics, news feed data, and the like. As described hereinafter, user activity information is associated with an information resource to enable generation of a visual representation of the user activity associated with the information resource. For example, consider the case where the information resource is database data and where a database management system logs instances of user queries against the database data in a log file entry. Each log file entry may contain, among other things, the username and the date/time associated with the query. The data in the log file entries may be associated with an identifier of the database data. By doing so, a visual representation of the user activity associated with the database data (e.g., who queried the database data and when the query was executed against the database data) may be generated by applying the techniques described herein.

According to the embodiment illustrated in FIG. 1, each dust particle of collection 102 symbolically represents a user that conducted an online or offline activity associated with displayed information resource 106. Each dust particle may exhibit a set of visual attributes that convey both the conducted user activity and selected dimensions of the user activity. For example, the online activity of requesting a web page from a web server might be considered. To visually represent this activity, a dust particle may be colored grey. Further, the shade of grey may vary from light to dark depending on how recently the represented user visited the web page. Still further, the distance between grey-colored dust particles may represent the actual geographic distance between the users that requested the web page. Thus, in this example, a collection of dust particles provides a visual indication of the number of users that visited the web page, when those users visited, and where those users were, relative to each other, when those users visited the web page.

The preceding example is but one of many possible combinations of visual attributes that may be applied to a dust particle in order to convey different types and dimensions of user activity. By applying a combination of visual attributes to a symbolic representation of a user, virtually any type and dimension of a user activity may be visually represented. Representing different types and dimensions of user activity by mapping and applying visual attributes to dust particles is explained is greater detail hereinafter.

Symbolic Representation of Users

Often, when humans interact with the elements of the real world, those humans leave behind dust, or other indicia of activity, on those elements. In one embodiment of the invention, a dust particle is used as a symbolic representation of a user because a dust particle provides a universal and culturally agnostic representation of human activity (or a lack thereof). In contrast, a symbolic representation that uses words or icons with specific cultural characteristics may not be universally decipherable. However, in alternative embodiments of the invention, other symbolic representations, which are capable of taking on multiple visual characteristics and exhibiting multiple behaviors, may be used instead of dust particles. Embodiments of the invention are not limited to any specific symbolic representation. For example, instead of a being represented by a dust particle, each user may be presented by a star, a grain of sand, a snow flake, or the like.

A dust particle may be graphically represented as a pixel and therefore may provide an efficient and unobtrusive visual indication of user activity associated with an information resource. The visual indication may be efficient because, similar to how dust collected on a real-world object in the physical world can provide a quick and intuitive indication of physical activity associated with the object, a collection of pixels displayed in conjunction with an information resource, such as collection 102 displayed on information resource 106, may provide a quick and intuitive indication of user activity associated with the information resource. Further, the visual indication may be unobtrusive because a collection of dust particles, such as collection 102 on information resource 106, may be displayed in conjunction with the display of an information resource in such a way so as to not require the user to focus on the visual indication unless the user chooses to do so. For example, by placing a collection of dust particles near the border of a web page, the collection is presented in the periphery of the user's initial focus, which is on the content of the web page. By virtue of the placement of the collection of dust particles on the display of a client device in conjunction with the display of an information resource, the user may choose to make the collection the focus of the user's attention. However, the user is not forced to focus on the collection, unlike, for example, web page pop-up advertisements which often require the user's attention in order for the user to view web page content.

Although an embodiment of the invention provides an unobtrusive and peripheral visual indication of online or offline activity associated with an information resource, embodiments of the invention are not limited to any particular placement of the collection of dust particles on the display of a client device. For example, a collection of dust particles may be displayed along the right border of a web page to accommodate character sets that read right to left. Further, the collection may be displayed next to a particular element of a displayed information resource, such as a hyperlink or an image in a displayed web page, to provide a visual indication of user activity associated with the particular element.

Visually Representing Different User activities

A collection of dust particles may comprise many types of dust particles, where each type visually represents a different user activity. To represent a user activity, the activity may be mapped to a set of visual attributes. The set of visual attributes may be unique so that users can visually discern one type of user activity from another.

For example, collection 102 may comprise grey-colored dust particles to represent the user activity of visiting a web page such as web page 106. Further, collection 102 may comprise green-colored dust particles to represent the user activity of being "online." An online user may be a user that currently has an authenticated login session established with the website that serves web page 106.

Differentiating between different user activities may be based on more than color. The activity may be mapped to one or more other visual attributes such as, for example, shape, size, translucency, iconicity, brightness, and contrast. Thus, by applying a set of visual attributes to a dust particle, virtually any user activity may be conveyed.

Unlike tag clouds which can be used only to represent the activity of "tagging" a web resource, Dust can visually represent virtually any user activity associated with an information resource. Therefore, Dust may be used to improve visualization of user activity.

Exemplary Types of Dust Particles

According to one embodiment, the user activity of "anonymously" requesting a particular web page is represented as a grey-colored dust particle. When the particular web page is viewed, a collection of grey-colored dust particles is displayed to provide a visual representation of the users or groups of users that have anonymously requested the particular web page.

According to one embodiment, the user activity of being "online" is represented as a green-colored dust particle. A user may be online if the user has established an authenticated session with the website serving a web page. A collection of green-colored dust particles displayed on the web page provides a visual indication of the users that are online at the moment that the collection is displayed.

According to one embodiment, "smart" user activity is represented as a blue-colored dust particle. A smart user activity is user activity associated with a first web page that is interesting or relevant to users who view a second web page. Blue-colored dust particles are displayed on the second web page to visually represent smart user activity associated with the first web page. Further, the first and second web pages may be part of two different websites. For example, a blue-colored dust particle may appear on a web page (second web page) to indicate a user who has bookmarked the web page using a bookmarking website (first web page). As another example, a blue-colored dust particle may appear on a web page (second web page) to indicate a user that has created a blog entry using a blogging website (first web page) that references the web page (second web page). As yet another example, a blue-colored dust particle may appear on a web page (second web page) to visually represent a user or a group of users that found the web page (second web page) particularly relevant to a search query submitted to a search engine (first web page).

According to one embodiment, a messaging user activity is represented as a yellow-colored dust particle. A collection of yellow-colored dust particles may be displayed on a web page to provide a visual representation of users who have left a message for and/or are open to chat with the current visitor to the web page using an instant messaging application, such as Yahoo! Messenger. This example illustrates that Dust can be used to represent non-web-browsing user activities such as instant messaging, e-mail, and the like.

According to one embodiment, a "friendly" messaging user activity is represented as a brightly colored dust particle so that the dust particle visually stands out from other dust particles. A friendly message is a message left by someone the current visitor viewing the web page considers a friend or someone within two degrees of separation from someone the current visitor considers a friend. To represent the degree of separation, the color red is used to represent one degree of separation, the color orange represents two degrees, and light orange represents three degrees of separation. The friend relationship between users may be based on an external application, such as an instant messaging application, an e-mail application, a social networking application, and the like. Specifically, the list of friends that a user has specified using an external application (for example, in an e-mail address book) may be used to determine who the user's friends are.

According to one embodiment, a "path" user activity is represented as purple-colored dust particle that is two times the size of other dust particles displayed on the web page. A path dust particle is left on a web page by a first user for a second user to find when the second user views the web page. The path dust particle suggests a browsing path or web page links for the second user to follow from the currently viewed web page. By leaving path dust particles on a collection of web pages, the first user can create a path through the Internet for the second user to follow. For example, a husband and wife planning a vacation might be considered. The wife may use a search engine website to collect a list of web page links to various car rental, airline, and hotel web pages. Using an interface displayed on a web browser, the wife may enter data into the interface so that a path dust particle is left for her husband on an airline web page that links to a car rental web page. The link may be established by a Hyper Text Markup Language (HTML) construct that specifies a Uniform Resource Locator (URL) of the car rental web page. When the airline web page is viewed by the husband, the husband sees the path dust particle left by his wife. By interacting with the path dust particle, the husband may see a message left for him by his wife and/or a link to the car rental web page. Thus, a collection of path dust particles displayed on a web page provides a visual indication of users who have left "paths" for the web page's current visitor to follow.

According to one embodiment, an "altruistic" user activity is represented as a white-colored dust particle with a blue border. An altruistic user activity is a tip or suggestion from one user for the benefit of all users. For example, an altruistic dust particle may be displayed on the web page of a restaurant to represent a user who has written a review of the restaurant. By interacting with the dust particle, a current visitor to the web page can read the review or link to another web page that provides the review. Thus, a collection of altruistic dust particles displayed on a web page provides a visual indication of users who have left tips, reviews, information or suggestions about content on the web page.

According to one embodiment, the appearance of a dust particle on a web page may be purchased or sponsored. Such "sponsored" user activity may be represented as a gold-colored dust particle. For example, an auto repair shop may pay a search engine website to have a sponsored dust particle appear on a search result web page returned in response to search queries containing keywords related to auto repair. Thus, a collection of sponsored dust particles displayed on a web page provides a visual indication of users who have paid to have information associated with the web page.

The preceding examples are non-limiting examples of the types of user activity that may be visually represented with Dust. Further, the particular visual attributes described in the examples above are described only for the purpose of explaining embodiments of the invention and are not necessarily required in order to practice all possible embodiments of the invention.

Visually Representing Multiple Dimensions of a User activity

In addition to being applied to a dust particle in order to visually represent multiple user activities, a combination of static and behavioral visual attributes may be applied to a dust particle in order to convey multiple dimensions of a user activity. A dimension of a particular user activity is any aspect of the activity that is of particular interest to users and that may be selected to be visually represented using the techniques described herein. In one embodiment of the invention, to visually represent a dimension of a user activity, the dimension is mapped to one or more static or behavioral visual attributes that can be applied to the type of dust particle that represents the user activity. Typically, a dimension of a user activity relates to the who, what, when, and where of a user activity, because this information, when associated with an information resource, is often useful to the viewer viewing the information resource in assessing the relevance and popularity of the information resource.

According to an embodiment, the selected dimensions of a user activity include temporal, periodic, geographical, social, and/or topical dimensions of the user activity. A temporal dimension relates to the date and time of a user activity—for example, the date/time of a request for a web page. A periodic dimension relates to a user activity that reoccurs at intervals of time—for example, how often a user has logged in during the past month. A geographic dimension relates to the physical location of a user activity. A social dimension relates to how the user that conducted the user activity is related to the user viewing the visual representation of the user activity. Finally, a topical dimension of a user activity is an aspect of the user activity that is of current or local interest to the user viewing the visual representation of the user activity.

Continuing an example from above in which the color grey is used to represent the type of user activity of requesting a particular web page, a temporal dimension of the user activity, such as the date/time of the request for a web page, may be conveyed by applying another visual attribute to the grey-colored dust particles. For example, shade may be used to represent how recently the user requested the web page, with a lighter grey indicating a less recent request and a darker grey indicating a more recent request.

Dimensions of a user activity may be visually represented with static visual attributes or behavioral visual attributes. Non-limiting examples of static visual attributes for representing dimensions of a user activity include color, shade, size, and the like. Additionally, a dust particle may exhibit a behavior to convey a particular dimension of a user activity. For example, a "messaging" type dust particle may sparkle to indicate that the intended recipient of a message that is associated with the dust particle has yet to read the message. More non-limiting examples of dust behaviors are discussed in greater detail hereafter.

Additional visual attributes may be applied to a dust particle to represent multiple dimensions of a user activity. By applying a combination of visual attributes to a dust particle, multiple dimensions of a user's user activity may be visually conveyed. Continuing with the example of the grey-colored dust particle, in which shade is used to convey a temporal dimension of a user activity, a geographic dimension, for example, may be indicated by spacing displayed dust particles in proportion to the actual geographic distance between the users represented by the dust particles. To give such geographic indication, the dust particles may, for example, arrange themselves in the form of a map of the Earth.

The same visual attribute applied to one type of dust particle to convey one particular dimension of a user activity may be applied to another type of dust particle to indicate a different dimension of a different user activity. For example, shade may be used to represent a social dimension of one user activity, but, at the same time, shade also may be used to indicate a temporal dimension of a different user activity. Again, continuing an example from above, shade when applied to grey-colored dust particles may be used to convey how recently a user visited a particular web page. Simultaneously, shade when applied to a green-colored dust particle may be used to indicate the social relationship between (a) an online user represented by the dust particle and (b) the current visitor to the web page. Light green might indicate no relationship at all, and dark green might indicate that the current visitor and the online user are close "friends."

Exemplary Dust Particle Behaviors

The following are non-limiting examples of the types of behaviors that dust particles may exhibit in order to visually convey dimensions of a user activity. However, a dust particle may exhibit other behaviors within the spirit and scope of embodiments of the invention in order to convey dimensions of a user activity.

According to one embodiment, a dust particle may sparkle to draw the user's attention. This sparkling behavior may be applied, for example, to a "messaging" type dust particle to represent a message that the user has not yet read. Instead of sparkling, other similar behaviors, such as glowing and blinking, may be applied to a dust particle to achieve the same purpose of alerting the user to a message or presence.

According to one embodiment, a dust particle may age or fade to give the user an indication of relevance or popularity of the content of the information resource. Other behaviors within the spirit and scope of embodiments of the invention may be applied to achieve the same objective.

According to one embodiment, dust particles may "clump" into logical groups. A clump of dust particles is one or more dust particles that visually appear as a cluster. A clump may appear near a visible label that indicates how the dust particles comprising the clump are logically grouped. The grouping may be based on virtually any attribute associated with the users and/or user activities represented by the dust particles comprising the clump. For example, dust particles may clump based on the age, sex, or nationality of the users whose user activities the dust particles represent. For another example, dust particles may clump based on the geographic location or date of the user activity. In one embodiment, the user may use an input device such as a mouse and/or keyboard in order to select the desired grouping.

Interactive Dust Particles

As well as providing a visualization of user activity associated with a web page, Dust may be interactive. The type of interaction possible may vary depending on the type of dust particle. For example, the user may use a mouse or other suitable input device to select a particular "messaging" dust particle from among a collection of dust particles, such as collection 102. Upon selecting the "messaging" dust particle, either by moving a pointing device over the dust particle or by clicking on the dust particle, a message associated with the dust particle may be responsively displayed to the user in a balloon dialog or similar graphical user interface component. Further, the balloon dialog might permit further interaction such as, for example, allowing the user to send a reply to the message or launch an instant messaging application that enables the user to engage in a chat session with the user that left the message.

For the types of user activities in which a user leaves a dust particle on a web page for another user, such as a "messaging" type dust particle, an interface may be provided so that a user can input the data required to leave the dust particle. The interface may be provided by the application displaying the web page such as a web browser or a plugin to the application such as Yahoo! Toolbar. The interface may provide, for example, a text box in which the user can enter a message and an interface component for selecting the user or users to receive the message.

Visual attributes for visually conveying dimensions of a user activity may be selectively enabled or disabled by the user. The user may use a keyboard and/or mouse or other similar input device to interact with a displayed dust particle or group of dust particles. Such interaction may involve the user selecting how the dust particles are positioned relative to one another. For example, the user may request that the dust particles be arranged to convey a geographic dimension of a user activity. In such a case, the dust particles representing the user activity may, for example, space themselves according to the actual geographic distance of the users that conducted the user activity. As another example, the user may request that the dust particles be arranged according to a temporal dimension. Under such circumstances, the dust particles may, for example, arrange themselves along a timeline or histogram. As yet another example, the user may request the dust particles be arranged according to a social dimension. Under such circumstances, the dust particles may, for example, arrange themselves as concentric circles with the inner most circle of dust particles representing the user's closest "friends".

Dust may permit the user to selectively filter which dust particles are displayed to the user. Dust may provide a user interface such as a drop-down select box that allows the user to select filtering criteria to apply to the currently displayed collection of dust particles. Upon a user's selection of filtering criteria, the display of the collection of dust particles on the web page is altered to satisfy the filtering criteria. The filtering criteria may be based on virtually any data attribute of the dust particles. For example, filtering criteria may be based on the type of user and/or the type of user activity.

Further, Dust may permit the user to rearrange, selectively, how the collection of dust particles, such as collection 102, is displayed to the user. Arrangement criteria may be selected similarly to filtering criteria. Upon selection of arrangement criteria, the arrangement of the display of the collection of dust particles is adjusted to satisfy the arrangement criteria. Like filtering criteria, arrangement criteria may be based on virtually any data attribute of the dust particles. Continuing an example from above, the user may select to arrange dust particles according to a selected logical grouping such as geographic location. Continuing another example from above, the user may select to arrange dust particles according to a selected dimension of represented user activities such as temporal, geographic, and social dimensions.

Adapting Appearance Based on Viewing Context

The visual attributes exhibited by a dust particle may adapt based on the context in which the dust particle is viewed. Specifically, visual attributes mapped to a user activity or a dimension of a user activity may be altered based on the context in which those attributes are applied to a dust particle. The type of alteration depends on the viewing context. For example, the presentation of a collection of dust particles, such as collection 102, may adapt to take into account the type of data and display available via the device displaying the collection of dust particles. Such devices may be as varied as a mobile device, a personal computer, a television, etc.

Privacy and Anonymity

Most user activity on the Internet is anonymous. That is, users conducting online ser activities often do not uniquely identify themselves to the server or servers providing the web service involved in the user activity. For example, a typical request to a web server for a web page is anonymous because the request typically does not provide data that uniquely identifies the user making the request. Thus, when an anonymous user activity is visually represented, the identity of the user cannot be conveyed to the user viewing the visual representation.

In contrast, an online user activity is no longer anonymous when the user conducting the user activity has identified him or herself to the server or servers providing the online services involved in the user activity. For example, if the user has established an authenticated login session with a web server that provides a particular web page, then the user's request for the web page may include a unique identifier of the user. Thus, when a non-anonymous user activity is visually represented, the identity of the user may also be visually represented. Further, additional dimensions of the user activity may be visually represented based on the relationship between the user that conducts the user activity and the user that views the visual representation of the user activity.

In cases where a user conducts non-anonymous user activity, the user may desire that information about the user activity remain private. Specifically, the user may not wish to have a visual representation of the user activity displayed to other users. To achieve desired privacy, a user may selectively opt out of Dust such that visualizations of the user's non-anonymous user activities are not displayed to other users. The user may opt out of Dust entirely or on a selective basis. Opting out on a selective basis may be based on criteria of the non-anonymous user activities the user conducts and/or the identities of other users. For example, a user may desire that her friends be able to see visualizations of her non-anonymous user activities but that everyone else not see the visualizations.

Exemplary Operating Environment

Figure 2:
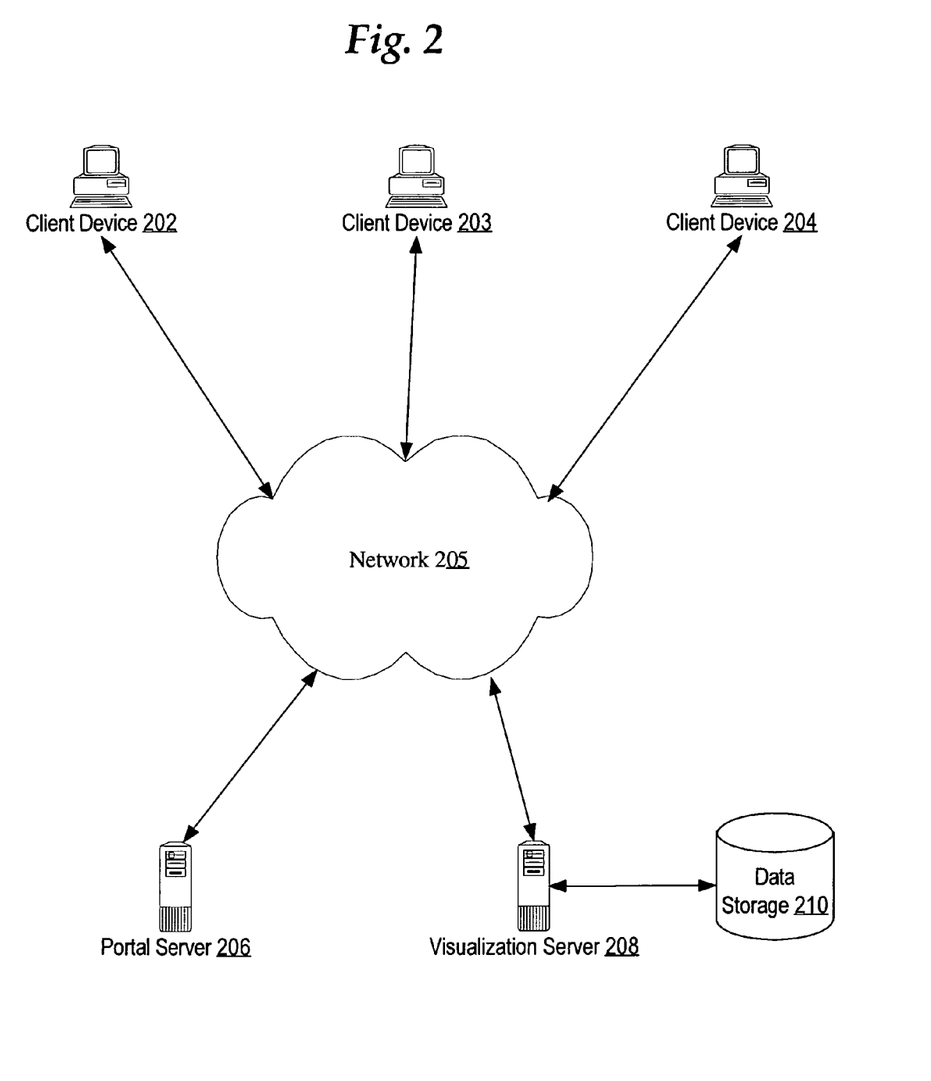
FIG. 2 is a block diagram that illustrates an exemplary implementation environment for an embodiment of the invention.

FIG. 2 is a block diagram that illustrates an exemplary implementation environment 200 for implementing Dust. However, not all of these components may be required to practice the invention, and variations in the arrangement and type of the components may be made without departing from the spirit or scope of embodiments of the invention.

As shown in FIG. 2, system 200 includes client devices 202-204, a network 205, an optional portal server 206, a visualization server 208, and data storage 210. Network 205 is in communication with and enables communication between each of client devices 202-204, portal server 206, and visualization server 208.

Client devices 202-204 may include virtually any computing device capable of receiving and sending a message over a network, such as network 205, to and from another computing device, such as visualization server 208, each other, and the like. The set of such devices may include devices that typically connect using a wired communications medium such as personal computers, multiprocessor systems, programmable consumer electronics, network PCs, and the like. The set of such devices may also include devices that typically connect using a wireless communications medium such as cell phones, smart phones, or virtually any mobile devices, and the like. Similarly, client devices 202-204 may be any device that is capable of connecting using a wired or wireless communication medium such as a cell phone, smart phone, PDA, and any other device that is equipped to communicate over a wired and/or wireless communication medium.

Each client device within client devices 202-204 may include a browser application that is configured to send, receive, and display web pages, and the like. The browser application may be configured to receive and display graphics, text, multimedia, and the like, employing virtually any web-based language, including, but not limited to HyperText Markup Language (HTML), Cascading Style Sheets (CSS), extensible markup language (XML), a wireless application protocol (WAP), Wireless Markup Language (WML), WML-Script, JavaScript, and the like.

Client devices 202-204 may be further configured to receive a message from another computing device employing another mechanism, including, but not limited to email, instant messaging (IM), internet relay chat (IRC), and the like.

Client devices 202-204 may be further configured to provide a user with a visual representation of user activity by employing the techniques described herein. As such, client devices 202-204 may further include a client application that is configured to display such visual representations to the user on a display of the client device. The client application may interact with a process such as described below to retrieve data for displaying the visual representation of user activity.

In an embodiment, the client application is a web-browsing application, such as the one discussed above, that is configured for displaying web pages along with a visual representation of user activity. To generate the visual representation, the browser application may be configured to display dust particles by employing virtually any web-based language supported by standard industry web-browsing applications such as Internet Explorer and Mozilla Firefox. These languages include, but are not limited to, HyperText Markup Language (HTML), Cascading Style Sheets (CSS), extensible markup language (XML), a wireless application protocol (WAP), Wireless Markup Language (WML), WML-Script, JavaScript, and the like.

In another embodiment, the client application is a standalone client/server application that is configured for displaying a visual representation of user activity associated with a displayed information resource. The client/server application may be configured to generate and display dust particles in conjunction with the display of an information resource on the display of a client device. The client/server application may invoke an application programming interface (API) provided by the host operating system executing on the host client device for generating and displaying dust particles.

In an embodiment, the client application is a plugin to a web-browsing application, such as Yahoo! Toolbar, that is configured to work cooperatively with the web-browsing application for displaying Dust. The plugin may be configured to generate and display dust particles as an overlay to the currently displayed web page. The plugin may invoke an application programming interface (API) provided by the web-browsing application for generating and displaying the overlay. Alternatively, the plugin may contain logic for generating and displaying the overlay.

Network 205 is configured to couple computing device to another computing device to enable those computing devices to communicate. Network 205 is enabled to employ any form of machine-readable media for communicating information from one electronic device to another. For example, network 205 may include the Internet, one or more local area networks (LANs), one or more wide area networks (WANs), or any combination thereof. In essence, network 205 may include any communication system by which information may travel between client devices 202-204, portal server 206, and/or visualization server 208. Computing devices may access network 205 via wired or wireless interfaces.

Portal server 206 and visualization server 208 may comprise multiple computing devices or a single computing device. Portal server 206 may provide online services such as messaging, search, news, shopping, advertising, and the like. Visualization server 208 may provide similar services and/or other services for generating visual representations of user activity associated with a web page. For exemplary purposes, the operations of portal server 206 and visualization server 208 are described together, and generally refer to visualization server 208. Briefly, visualization server 208 may include any computing device capable of connecting to network 205 and providing, in response to a request from a client such as client devices 202-204, data for generating visual representations of user activity associated with a web page. Devices that may operate as visualization server 208 include dedicated servers, personal computers, desktop computers, multiprocessor systems, network PCS, and the like.

The operating environment also includes a non-volatile data storage 210 for storing various information used by visualization server 208 in responding to requests from clients 202-204. For example, data storage 210 may be a conventional database storing data for generating visual representations of user activity associated with a web page.

In response to a request from a client device such as client devices 202-204, visualization server 208 may be configured to provide data for generating a visual representation (e.g., dust particles) of user activity associated with an information resource identified in the request. The request from the client may identify the information resource by a unique identifier of the information resource. Any identifier suitable for uniquely identifying an information resource may be used. For example, a web page may be uniquely identified by the web page's uniform resource locator (URL). As such, visualization server 208 may provide data that the requesting client may use to generate a visual representation of user activity associated with the identified information resource.

In an embodiment, the data for generating a visual representation of user activity associated with a web page is sent from visualization server 208 in response to a request for a particular web page from a client device such as client devices 202-204. The client device may request a web page from visualization server 208 using virtually any web-based protocol for requesting web pages. Such protocols include HyperText Transfer Protocol (HTTP) and the like. In response to receiving such a request, visualization server 208 sends data to the requesting client. The data so sent includes data for use in generating both a display of the web page and a visualization of user activity associated with the web page.

In another embodiment, visualization server 208, in response to a request from a client device, sends only data for use in generating a visualization of user activity associated with an information resource identified in the request.

User Activity Information

Figure 3:
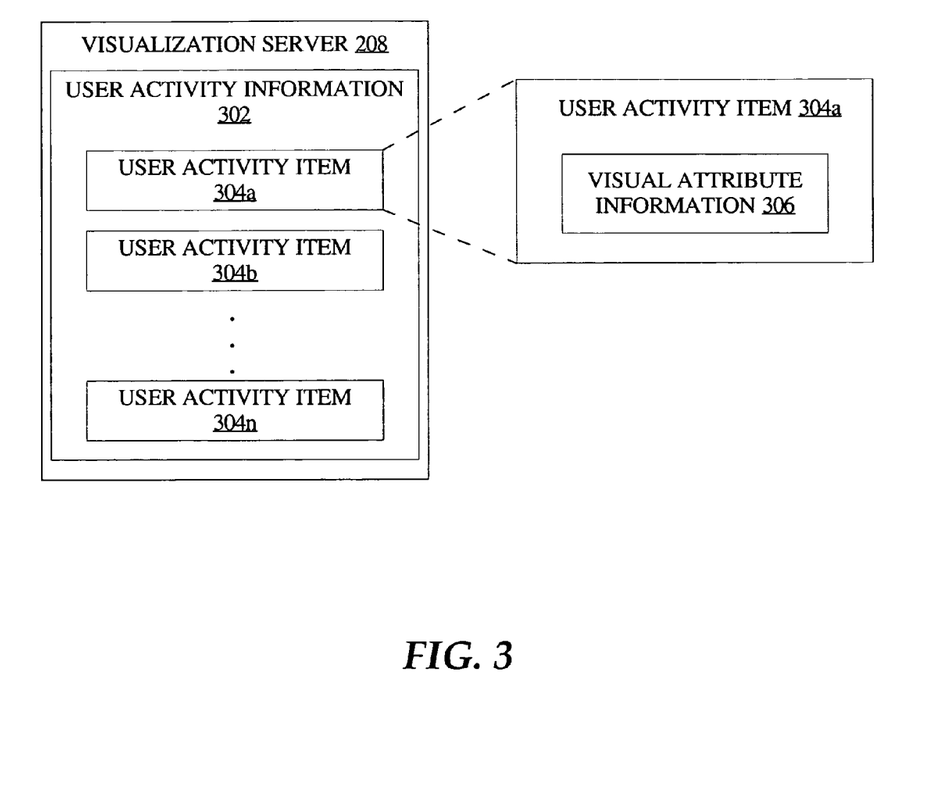
FIG. 3 is a block diagram that illustrates data used by a visualization server according to an embodiment of the invention.

FIG. 3 is a block diagram that illustrates data used by a visualization server, such as visualization server 208, according to an embodiment of the invention. Visualization server 208 accesses and retrieves user activity information 302 from data storage 210 and, therefore, at times includes user activity information 302 in local volatile memory, such as Java Virtual Memory in RAM. Optionally, visualization server 208 may have all or portions of user activity information 302 cached locally, either in local volatile or non-volatile memory, such that it is not necessary for visualization server 208 to access and retrieve the cached user activity information from data storage 210.

User activity information 302 is based on data generated by the online or offline user activities of one or more users. Online activity data may be obtained, for example, from any server involved in the online user activities that generate the activity data including visualization server 208 and/or portal server 206. Typically, servers involved in a user activity record activity data in log files and/or in databases in response to requests from users requesting resources and services from the servers. Offline activity data may be collected by electronic physical sensors and reported to visualization server 208. Alternatively, offline activity data may be reported directly to visualization server 208 through a user or programming interface provided by visualization server 208.

User activity information 302 may be associated with an information resource by associating user activity data 302 with an identifier of the information resource. Any identifier suitable for identifying an information resource may be used, for example, a Uniform Resource Locator (URL) may be used to identify a web page. As described further below, an incoming request from a client device, such as client device 202-204, is a typical event that triggers visualization server 208 to access user activity information 302.

User Activity Information Items

User activity information 302 includes one or more user activity information items 304*a-n*. Generally, user activity information items 304*a*-304*n* include information about one or more user activities conducted by one or more users. More specifically, each of user activity information items 304*a-n* include information about an instance of a particular user activity conducted by a user. For example, the user activity of requesting a web page from a web server might be considered. In this example, user activity information, such as information in user activity information item 304*a*, may include information about an instance of the user activity of requesting a web page such as, for example, the date/time of the request for a web page and an identifier of the user that made the request. As another example, the offline user activity of taking a jog might be considered. In this example, user activity information, such as information in user activity information item 304*b*, may include information about a particular jog such as, for example, the data/time of the jog, the distance traveled, the path traveled, calories burned, and a unique user provided name for the jogging activity, etc.

In one embodiment of the invention, based on information provided in a request from a client device 202-204, visualization server 208 accesses user activity information 302. The form and data container structure in which user activity information 302 is stored in data storage 210 is a detail that may vary from implementation to implementation. For non-limiting examples, user activity information may be stored in one or more relational data tables, in one or more object-oriented programming objects (e.g., Java objects), or in one or more files.

Each user activity information item 304*a-n* includes information regarding visual attribute information 306.

Visual attribute information 306 includes information about the visual attributes mapped to user activity information item 304*a*. The visual attributes mapped to user activity information item 304*a* include the visual attributes mapped to the type of user activity represented by user activity information item 304*a* and the visual attributes mapped to selected dimensions of the type of user activity represented by user activity information item 304*a*. For example, user activity information item 304*a* might represent the user activity of being online. Further, a temporal dimension of the user activity, such as how long the user has been online, might have been selected. Under such circumstances, visual attribute information 306 will include both (a) information about the visual attributes mapped to the user activity of being online and (b) information about the visual attributes mapped to the selected temporal dimension of the online user activity.

In one embodiment, a client device, such as client device 202-204, includes an identifier of an information resource in a request to visualization server 208. In response, visualization server 208 returns, to the client device, user activity data 302 associated with the information resource identified in the request. The user activity data 302 sent to the client device includes user activity information items 304a-n and associated visual attribute information 306. The client device uses received user activity data 302 sent from visualization server 208 to generate a visual representation of the user activity associated with the identified information resource.

Extension and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Exemplary Hardware Implementation

Figure 4:
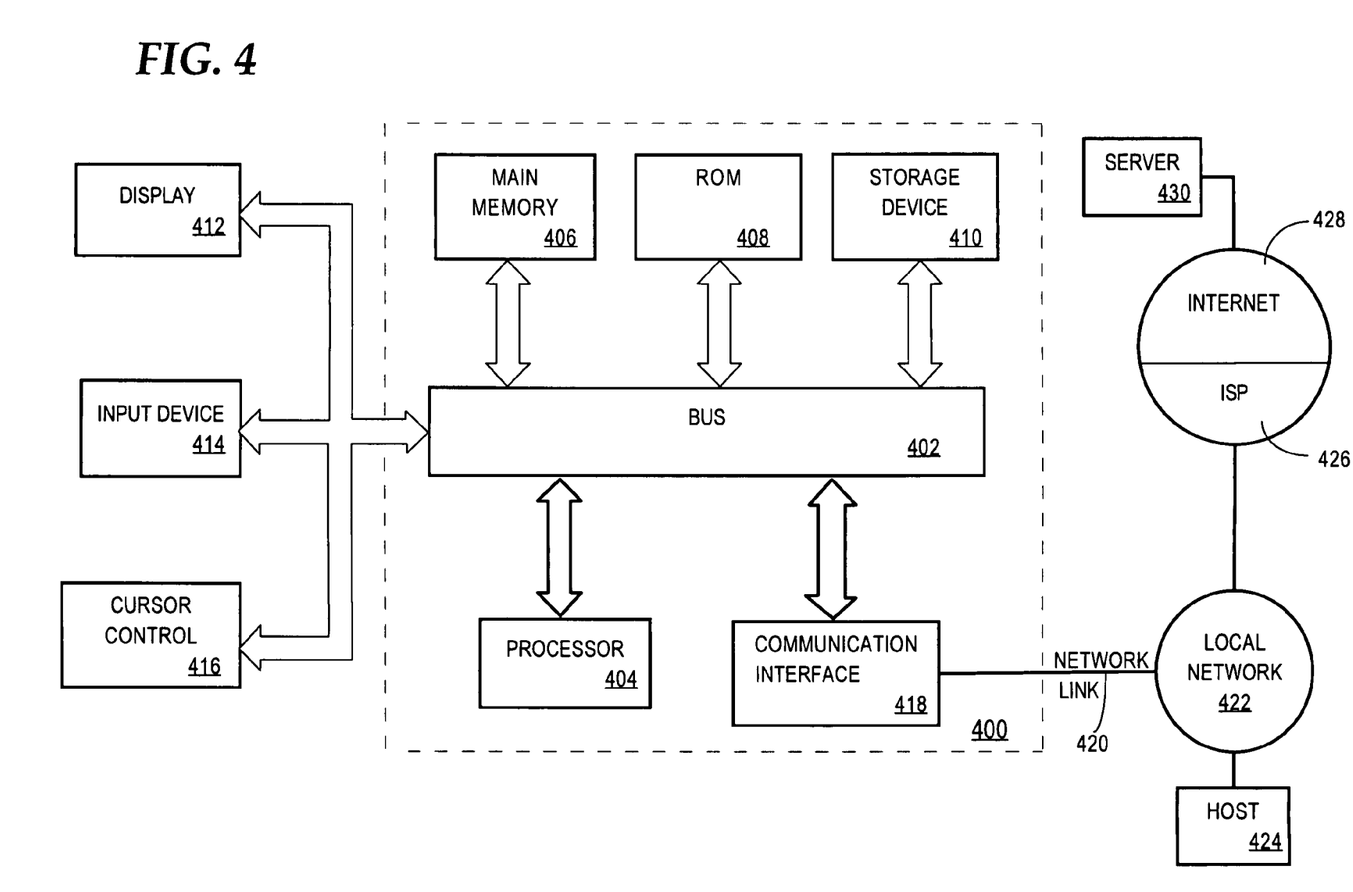
FIG. 4 is block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

What is claimed is:

1. A method for generating a visual representation of user activity, the method comprising the computer-implemented steps of:
    storing, in association with an information resource, information that is based on one or more user activities conducted by one or more users;
    wherein each user of the one or more users conducted at least one user activity of the one or more user activities;
    storing information that represents a mapping between each of the one or more user activities and a set of visual attributes;
    for each of the one or more users, generating a visual representation of the user activities that the each user conducted by applying the visual attributes mapped to the user activities that the each user conducted to a symbolic representation of the each user; and
    causing the visual representations to be displayed on the information resource such that content of the information resource is not visibly obstructed by the visual representations;
    wherein the visual attributes applied to a symbolic representation of a particular user of the one or more users indicates that the particular user is a friend of a current viewer of the information resource.

2. The method of claim 1 wherein said one or more user activities are associated with the information resource.

3. The method of claim 1 wherein at least one of the one or more user activities is an offline activity and at least one of the one or more user activities is an online activity.

4. The method of claim 1 wherein said information resource is a web page.

5. The method of claim 1 wherein said mapping between each of the one or more user activities and a set of visual attributes includes a mapping between a dimension of at least one of the one or more user activities and a set of visual attributes.

6. The method of claim 5 wherein said dimension represents the who, what, where, or when of said one of the one or more user activities.

7. The method of claim 5 wherein said dimension represents a temporal, periodic, spatial, geographical, social, or topical aspect of said one of the one or more user activities.

8. The method of claim 1 wherein said information that represents a mapping between each of the one or more user activities and a set of visual attributes includes information that represents at least one of:
    a color of a symbolic representation of a user that conducted one of the one or more user activities;
    a size of a symbolic representation of a user that conducted one of the one or more user activities;
    a shade of a color of a symbolic representation of a user that conducted one of the one or more user activities;
    a shape of a symbolic representation of a user that conducted one of the one or more user activities; or
    a translucency of a symbolic representation of a user that conducted one of the one or more user activities.

9. The method of claim 1 wherein said information that represents a mapping between each of the one or more user activities and a set of visual attributes includes information that represents a behavior of a symbolic representation of a user that conducted one of the one or more user activities.

10. The method of claim 9 wherein said information that represents a behavior is selected from the group consisting of:
    information that represents an animation behavior of said symbolic representation of a user that conducted one of the one or more user activities,
    information that represents a sparkling behavior of said symbolic representation of a user that conducted one of the one or more user activities,
    information that represents a clumping behavior of said symbolic representation of a user that conducted one of the one or more user activities, and
    information that represents a fading behavior of said symbolic representation of a user that conducted one of the one or more user activities.

11. The method of claim 1 wherein said symbolic representation has the appearance of a pixel.

12. The method of claim 1, further comprising causing the visual representations to be displayed on the information resource in a corner of the information resource such that content of the information resource is not visibly obstructed by the visual representations.

13. The method of claim 1, further comprising:
    obtaining, from the current viewer of the information resource, filtering criteria to be applied to the visual representations;
    wherein the filtering criteria indicates that only visual representations of users that are friends of the current viewer are to be displayed on the information resource; and
    in response to obtaining the filtering criteria, causing display of the visual representations to be updated so that only visual representations for users that are friends of the current viewer are displayed on the information resource.

14. The method of claim 1, further comprising:
    obtaining, from the current viewer of the information resource, arrangement criteria to be applied to the visual representations;
    wherein the arrangement criteria indicates that the visual representations are to be arranged on the information resource according to a social relationship of the current viewer to each of the one or more users;
    in response to obtaining the arrangement criteria, causing display of the visual representations to be updated so that the visual representations are displayed on the information resource in an arrangement that conveys the social relationships.

15. The method of claim 1, wherein the visual attributes applied to the symbolic representation of the particular user indicates a degree of friendship between the particular and the current viewer.

16. A method comprising:
for each interacting user of a plurality of interacting users that interact with a particular web page, storing information that indicates attributes of that interacting user's interaction with the particular web page; and
in response to a particular user's request for the particular web page, generating, based on the information, a visual indication that includes a separate pixel for each interacting user in the plurality of interacting users;
wherein each separate pixel for each interacting user indicates, through visual appearance of the pixel, attributes of the interacting user's interaction with the particular web page; and
causing the separate pixels to be displayed on the particular web page such that content of the particular web page is not visibly obstructed by the separate pixels;
wherein a particular separate pixel for a particular interacting user of the plurality of interacting users indicates that the particular interacting user is a friend of a current viewer of the particular web page.

17. The method of claim 16, further comprising:
sending said particular web page, including said visual indication, over a network to a web browser client of said particular user.

18. The method of claim 16, further comprising:
receiving said particular web page, including said visual indication, at a web browser client of said particular user; and
displaying said particular web page, including said visual indication, to the particular user.

19. The method of claim 16, further comprising:
receiving said particular web page, without said visual indication, at a web browser client of said particular user;
adding said visual indication to the particular web page at the web browser client of said particular user; and
displaying said particular web page, including said visual indication, to the particular user.

20. The method of claim 16, wherein said information includes information that indicates a time of at least one interacting user's interaction with said particular web page; and wherein the visual appearance of the pixel that indicates attributes of the least one interacting user's interaction with said particular web page indicates the time of the at least one interacting user's interaction with said particular web page.

21. The method of claim 16, wherein said information includes information that indicates an identity of at least one interacting user's interaction with said particular web page; and wherein the visual appearance of the pixel that indicates attributes of the least one interacting user's interaction with said particular web page indicates the identity of the at least one interacting user's interaction with said particular web page.

22. The method of claim 16, wherein said information includes information that indicates a geographic location of at least one interacting user's interaction with said particular web page; and wherein the visual appearance of the pixel that indicates attributes of the least one interacting user's interaction with said particular web page indicates the geographic location of the at least one interacting user's interaction with said particular web page.

23. The method of claim 16, further comprising:
displaying said visual indication to the particular user; and
receiving input from said particular user through said visual indication.

24. The method of claim 23, further comprising:
in response to receiving said input, changing the visual appearance of at least one pixel included in the visual indication.

25. The method of claim 23, wherein the step of receiving input includes receiving input from said particular user through a pixel included in the visual indication.

26. The method of claim 25, further comprising:
in response to receiving said input from said particular user through said pixel, displaying to said particular user, a message associated with said pixel.

27. The method of claim 16, further comprising causing the separate pixels to be displayed on the particular web page in a corner of the particular web page such that content of the particular web page is not visibly obstructed by the separate pixels.

28. A non-transitory computer-readable medium storing one or more sequences of instructions, which instructions, when executed by one or more processors, cause:
storing, in association with an information resource, information that is based on one or more user activities conducted by one or more users;
wherein each user of the one or more users conducted at least one user activity of the one or more user activities;
storing information that represents a mapping between each of the one or more user activities and a set of visual attributes;
for each of the one or more users, generating a visual representation of the user activities that the each user conducted by applying the visual attributes mapped to the user activities that the each user conducted to a symbolic representation of the each user; and
causing the visual representations to be displayed on the information resource such that content of the information resource is not visibly obstructed by the visual representations;
wherein the visual attributes applied to a symbolic representation of a particular user of the one or more users indicates that the particular user is a friend of a current viewer of the information resource.

29. The non-transitory computer-readable medium of claim 28 wherein said one or more user activities are associated with the information resource.

30. The non-transitory computer-readable medium of claim 28 wherein at least one of the one or more user activities is an offline activity and at least one of the one or more user activities is an online activity.

31. The non-transitory computer-readable medium of 28 wherein said information resource is a web page.

32. The non-transitory computer-readable medium of claim 28 wherein said mapping between each of the one or more user activities and a set of visual attributes includes a mapping between a dimension of at least one of the one or more user activities and a set of visual attributes.

33. The non-transitory computer-readable medium of claim 32 wherein said dimension represents the who, what, where, or when of said one of the one or more user activities.

34. The non-transitory computer-readable medium of claim 32 wherein said dimension represents a temporal, periodic, spatial, geographical, social, or topical aspect of said one of the one or more user activities.

35. The non-transitory computer-readable medium of claim 28 wherein said information that represents a mapping between each of the one or more user activities and a set of visual attributes includes information that represents at least one of:
a color of a symbolic representation of a user that conducted one of the one or more user activities;
a size of a symbolic representation of a user that conducted one of the one or more user activities;
a shade of a color of a symbolic representation of a user that conducted one of the one or more user activities;
a shape of a symbolic representation of a user that conducted one of the one or more user activities; or
a translucency of a symbolic representation of a user that conducted one of the one or more user activities.

36. The non-transitory computer-readable medium of claim 28 wherein said information that represents a mapping between each of the one or more user activities and a set of visual attributes includes information that represents a behavior of a symbolic representation of a user that conducted one of the one or more user activities.

37. The non-transitory computer-readable medium of claim 36 wherein said information that represents a behavior is selected from the group consisting of:
information that represents an animation behavior of said symbolic representation of a user that conducted one of the one or more user activities,
information that represents a sparkling behavior of said symbolic representation of a user that conducted one of the one or more user activities,
information that represents a clumping behavior of said symbolic representation of a user that conducted one of the one or more user activities, and
information that represents a fading behavior of said symbolic representation of a user that conducted one of the one or more user activities.

38. The non-transitory computer-readable medium of claim 28 wherein said symbolic representation has the appearance of a pixel.

39. The non-transitory computer-readable medium of claim 28, further comprising instructions for causing the visual representations to be displayed on the information resource in a corner of the information resource such that content of the information resource is not visibly obstructed by the visual representations.

40. The non-transitory computer-readable medium of claim 28, further comprising instructions for:
obtaining, from the current viewer of the information resource, filtering criteria to be applied to the visual representations;
wherein the filtering criteria indicates that only visual representations of users that are friends of the current viewer are to be displayed on the information resource; and
in response to obtaining the filtering criteria, causing display of the visual representations to be updated so that only visual representations for users that are friends of the current viewer are displayed on the information resource.

41. The non-transitory computer-readable medium of claim 28, further comprising instructions for:
obtaining, from the current viewer of the information resource, arrangement criteria to be applied to the visual representations;
wherein the arrangement criteria indicates that the visual representations are to be arranged on the information resource according to a social relationship of the current viewer to each of the one or more users;
in response to obtaining the arrangement criteria, causing display of the visual representations to be updated so that the visual representations are displayed on the information resource in an arrangement that conveys the social relationships.

42. The non-transitory computer-readable medium of claim 28, wherein the visual attributes applied to the symbolic representation of the particular user indicates a degree of friendship between the particular and the current viewer.

43. A non-transitory computer-readable medium storing one or more sequences of instructions, which instructions, when executed by one or more processors, cause:
for each interacting user of a plurality of interacting users that interact with a particular web page, storing information that indicates attributes of that interacting user's interaction with the particular web page; and
in response to a particular user's request for the particular web page, generating, based on the information, a visual indication that includes a separate pixel for each interacting user in the plurality of interacting users;
wherein each separate pixel for each interacting user indicates, through visual appearance of the pixel, attributes of the interacting user's interaction with the particular web page; and
causing the separate pixels to be displayed on the particular web page such that content of the particular web page is not visibly obstructed by the separate pixels;
wherein a particular separate pixel for a particular interacting user of the plurality of interacting users indicates that the particular interacting user is a friend of a current viewer of the particular web page.

44. The non-transitory computer-readable medium of claim 43, further comprising instructions for:
sending said particular web page, including said visual indication, over a network to a web browser client of said particular user.

45. The non-transitory computer-readable medium of claim 43, further comprising instructions for: receiving said particular web page, including said visual indication, at a web browser client of said particular user; and
displaying said particular web page, including said visual indication, to the particular user.

46. The non-transitory computer-readable medium of claim 43, further comprising instructions for:
receiving said particular web page, without said visual indication, at a web browser client of said particular user;
adding said visual indication to the particular web page at the web browser client of said particular user; and
displaying said particular web page, including said visual indication, to the particular user.

47. The non-transitory computer-readable medium of claim 43 wherein said information includes information that indicates a time of at least one interacting user's interaction with said particular web page; and wherein the visual appearance of the pixel that indicates attributes of the least one interacting user's interaction with said particular web page indicates the time of the at least one interacting user's interaction with said particular web page.

48. The non-transitory computer-readable medium of claim 43 wherein said information includes information that indicates an identity of at least one interacting user's interaction with said particular web page; and wherein the visual appearance of the pixel that indicates attributes of the least one interacting user's interaction with said particular web page indicates the identity of the at least one interacting user's interaction with said particular web page.

49. The non-transitory computer-readable medium of claim 43 wherein said information includes information that indicates a geographic location of at least one interacting user's interaction with said particular web page; and wherein the visual appearance of the pixel that indicates attributes of the least one interacting user's interaction with said particular web page indicates the geographic location of the at least one interacting user's interaction with said particular web page.

50. The non-transitory computer-readable medium of claim 43, further comprising instructions for:
   displaying said visual indication to the particular user; and
   receiving input from said particular user through said visual indication.

51. The non-transitory computer-readable medium of claim 50, further comprising instructions for:
   in response to receiving said input, changing the visual appearance of at least one pixel included in the visual indication.

52. The non-transitory computer-readable medium of claim 50 wherein the step of receiving input includes receiving input from said particular user through a pixel included in the visual indication.

53. The non-transitory computer-readable medium of claim 52, further comprising instructions for:
   in response to receiving said input from said particular user through said pixel, displaying to said particular user, a message associated with said pixel.

54. The non-transitory computer-readable medium of claim 43, further comprising instructions for causing the separate pixels to be displayed on the particular web page in a corner of the particular web page such that content of the particular web page is not visibly obstructed by the separate pixels.

\* \* \* \* \*